US010891296B2

(12) United States Patent
Smiley et al.

(10) Patent No.: US 10,891,296 B2
(45) Date of Patent: Jan. 12, 2021

(54) SEARCH ENGINE FOR INDUSTRIAL ANALYSIS DEVELOPMENT TOOLSET

(71) Applicant: ABB Schweiz AG, Baden (CH)

(72) Inventors: Karen J. Smiley, Raleigh, NC (US); Pankeshkumar Gopalbhai Patel, College Park, MD (US); David N. Cox, Raleigh, NC (US)

(73) Assignee: ABB Schweiz AG, Baden (CH)

(*) Notice: Subject to any disclaimer, the term of this patent is extended or adjusted under 35 U.S.C. 154(b) by 204 days.

(21) Appl. No.: 16/215,803

(22) Filed: Dec. 11, 2018

(65) Prior Publication Data
US 2020/0183942 A1    Jun. 11, 2020

(51) Int. Cl.
*G06F 16/2457* (2019.01)
*G06F 16/9538* (2019.01)
*G06F 16/9535* (2019.01)

(52) U.S. Cl.
CPC .... *G06F 16/24578* (2019.01); *G06F 16/9535* (2019.01); *G06F 16/9538* (2019.01)

(58) Field of Classification Search
CPC ........... G06F 16/24578; G06F 16/9538; G06F 16/9535; G06F 16/955
See application file for complete search history.

(56) References Cited

U.S. PATENT DOCUMENTS

| 9,342,609 | B1 | 5/2016 | Mysen et al. |
| 9,386,359 | B2 | 7/2016 | Adler et al. |
| 9,563,705 | B2 | 2/2017 | Taank et al. |
| 2012/0185507 | A1* | 7/2012 | Paparizos ............ G06F 16/243 707/774 |
| 2012/0284259 | A1 | 11/2012 | Jehuda |
| 2013/0110802 | A1* | 5/2013 | Shenoy ................ G06F 16/955 707/706 |
| 2015/0294233 | A1 | 10/2015 | Aultman et al. |

(Continued)

OTHER PUBLICATIONS

M. Klusch, "Service discovery," Encyclopedia of Social Network Analysis and Mining, dated Oct. 5, 2014, pp. 46-63, Springer Science+Business Media, New York, USA.

(Continued)

*Primary Examiner* — Etienne P LeRoux
(74) *Attorney, Agent, or Firm* — Taft Stettinius & Hollister LLP; J. Bruce Schelkopf (57) ABSTRACT

Unique systems, methods, techniques and apparatuses for ranking and applying industrial analysis search results are disclosed. One exemplary embodiment is a computer implemented method comprising receiving a request to rank potential combinations of the data set and the plurality of data analysis tools; tagging the plurality of data analysis tools with one or more metadata tags selected from a plurality of metadata tags; tagging the data set with one or more metadata tags selected from the plurality of metadata tags; scoring a plurality of potential combinations of the data analysis tool and the plurality of data sets according to correspondence between the metadata tags tagged to the data analysis tool and the metadata tags tagged to each of the plurality of data sets; and outputting a user perceptible ranking of the plurality of potential combinations indicating the scoring.

20 Claims, 5 Drawing Sheets

(56) References Cited

U.S. PATENT DOCUMENTS

2016/0180479 A1* 6/2016 Khanzode ............. G06F 16/355
                                                        705/311
2017/0017698 A1   1/2017 Bullotta et al.
2017/0124486 A1   5/2017 Chan et al.
2017/0199943 A1* 7/2017 Steelberg ............ G06F 16/9032

OTHER PUBLICATIONS

G. Cassar et al., "Probabilistic matchmaking methods for automated service discovery," IEEE Transactions on Services Computing, dated Oct.-Dec. 2014, pp. 654-666, vol. 7, No. 4, IEEE.

S. Cheshire et al., "DNS-based service discovery," Internet Engineering Task Force (IETF), RFC 6763, dated Feb. 2013, 49 pages, IETF Trust, available at http://www.rfc-editor.org/info/rfc6763, last accessed May 17, 2018.

Rapidminer, "Data Science for Enterprise," available at https://rapidminer.com/, last accessed May 17, 2018.

Mesa, "Key performance indicator markup language (KPI-ML)," dated May 1, 2015, 47 pages, No. 1, MESA International, Chandler, USA.

W3C, "Semantic web," available at http://www.w3.org/standard/semanticweb/, last accessed May 17, 2018.

IBM Software, "jStart," available at http://www-01.ibm.com/software/ebusiness/jstart/about/, last accessed May 17, 2018.

* cited by examiner

| Analysis Tool | Rankings | Accuracy | Robustness | Usage History | Search Space | Evolvability | Outcome Data Type | Hierarchy Scope |
|---|---|---|---|---|---|---|---|---|
| Analysis Tool 1 | 3 | 99.9 | 5 | 3 Per Day | Global/Public | Dynamic | Actual KPI | Plant |
| Analysis Tool 2 | 1 | 99.9 | 4 | Every 1 Minute | Local | Dynamic | Predicted KPI | System |
| Analysis Tool 3 | 7 | 72.3 | 8 | Not Yet Used | Enterprise | Versioned | Operational Value | Equipment |
| ... | | | | | | | | |
| Analysis Tool Y | 8 | 87.3 | 7 | 2 Per Month | Global/Public | Versioned | Operational Value | Equipment |

Fig. 6B — 610

| Data Set | Rankings | Reliability | Freshness | Volume | Data Type | Data Source | Connectivity |
|---|---|---|---|---|---|---|---|
| Data Set A | 4 | 99.9900 | 6 Months | 1000 Records | Time-based | ABB | Online History |
| Data Set B | 8 | 75.6000 | 12 Months | 5980 Records | Time-based | ABB | Live Stream |
| Data Set C | 2 | 21.000 | 0.25 Months | 365 Records | Spatial | ABB | Online History |
| ... | | | | | | | |
| Data Set Z | 2 | 35.5000 | 5 Months | 2200 Records | Operational | Non-ABB | Offline History |

SEARCH ENGINE FOR INDUSTRIAL ANALYSIS DEVELOPMENT TOOLSET

BACKGROUND

The present disclosure relates generally to developing analysis for industrial applications within a toolset using ranked search engine results. Many toolsets for developing analysis provide a toolbox of data analysis tools that the user can configure for connection to specific types of data sets derived from data sources. These toolsets support connections to a plurality of data set types. Data analysis tools perform differently based on different characteristics of a data set, such as size or completeness. Existing toolsets suffer from a number of shortcomings and disadvantages. There remain unmet needs including identifying optimal combinations of data analysis tools and data sets since evaluating the combinations of all available data analysis tools and all available data sets would be impractical. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for ranking search results of industrial analysis tools and data sets. Further embodiments, forms, objects, features, advantages, aspects and benefits of the disclosure shall become apparent from the following description and drawings.

BRIEF DESCRIPTION OF THE DRAWINGS

FIG. 4 illustrates an exemplary user interface for a data set search engine.

DETAILED DESCRIPTION OF ILLUSTRATIVE EMBODIMENTS

Figure 1:
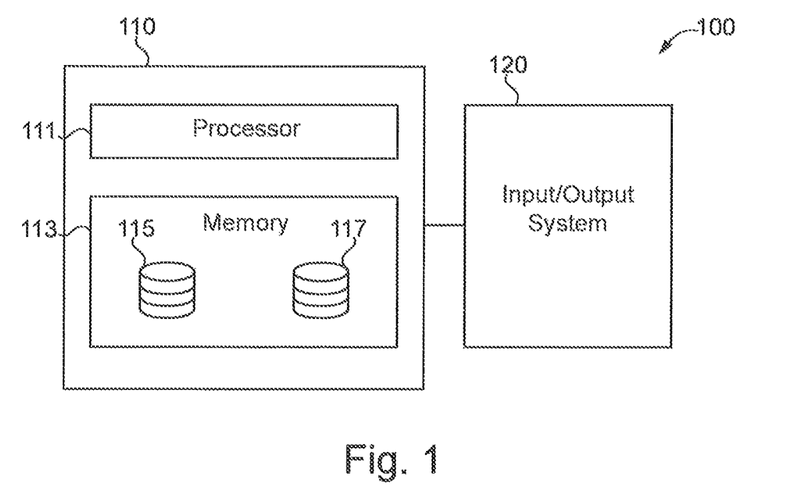
FIG. 1 is a block diagram illustrating an exemplary computing system.

With reference to FIG. 1 there is illustrated an exemplary computing system 100 configured to analyze and rank compatibility of potential combinations of data sets and data analysis tools for industrial applications. It shall be appreciated that system 100 may be implemented in a variety of applications, including enterprise asset health systems, real-time monitoring systems, real-time control systems, power distribution monitoring and control systems, and industrial plant management systems, to name but a few examples.

System 100 includes an input/output system 120 structured to receive input from a user, transmit the received input to a computing device 110, receive output from computing device 110, and display a graphical user interface (GUI).

Computing device 110 includes a processing device 111 and a memory device 113. Processing device 111 is structured to execute instructions received from memory device 113. Memory device 113 is a non-transitory computer readable medium structured to store executable instructions, a data structure 115 including information related to data sets, and a data structure 117 including information related to data analysis tools.

The data set information included in data structure 115 corresponds to characteristics of a data set, where each characteristic is represented as a metadata tag. Data structure 115 may be a grouped plurality of data set files embedded with metadata tags or a common information model including identifying information for each data set and corresponding metadata tags. Data structure 115 may also be a database or another type of data storage arrangement structured to store data sets. Data structure 115 is structured to make characteristics of data sets searchable by a user, as explained in more detail below.

The data analysis tool information included in data structure 117 corresponds to characteristics of a data analysis tool, where each characteristic is represented as a metadata tag. Data structure 117 may be a grouped plurality of data analysis tool files embedded with metadata tags or a common information model including identifying information for each data analysis tool and corresponding metadata tags. Data structure 117 is structured to make characteristics of data analysis tools searchable by a user, as explained in more detail below.

Metadata tags associated with each file may be based on a standard information model. In certain embodiments, metadata tags not based on a standard information model may be mapped to a master standard information model. In certain embodiments, metadata tags may be generalized to accommodate multiple standard information models.

Figure 2:
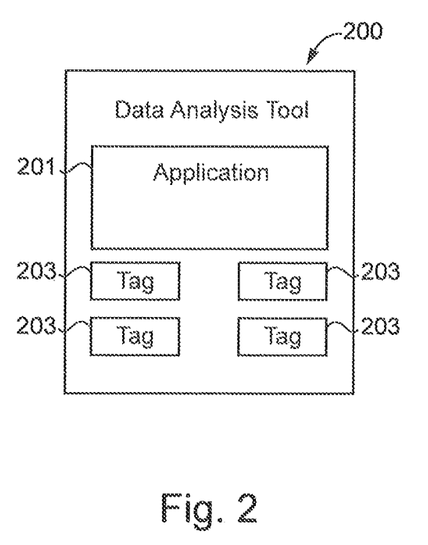
FIG. 2 is a block diagram illustrating an exemplary data analysis tool file.

With reference to FIG. 2 there is a box diagram illustrating an exemplary data analysis tool 200 including an application 201 and a plurality of embedded metadata tags 203. Application 201 comprises a set of executable instructions effective to perform analysis on a data set provided to the application. Metadata tags 203 are structured to identify characteristics of application 201, such as requirements of input data and application performance.

Metadata tags may be assigned to a data analysis tool by an algorithm developer or by an automated assignment process. Metadata tags allow data analysis tools to characterize tool quality and to specify minimum data attributes and data quality criteria for data sets used with the tool to produce results of a certain level of accuracy or usefulness.

Figure 3:
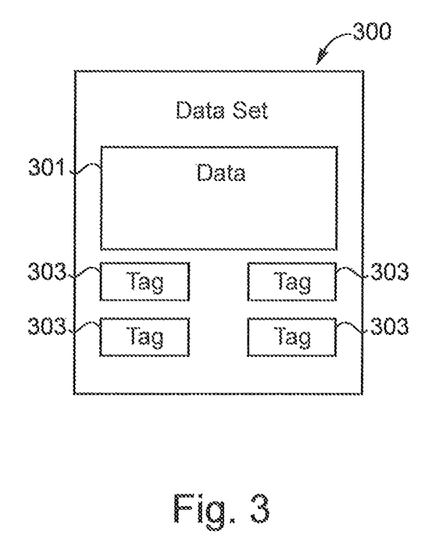
FIG. 3 is a block diagram illustrating an exemplary data set file.

With reference to FIG. 3 there is illustrated a box diagram illustrating an exemplary data set 300 including data 301 and a plurality of metadata tags 303. Data 301 comprises a set of data collected from an industrial data source. Metadata tags 303 are structured to identify characteristics of data 301, such as the type of data source or the completeness of the data.

With reference to FIG. 4 there is illustrated an exemplary data set search engine GUI 400 structured to display potential data set search criteria to a user. The search criteria correspond to characteristics of data sets or data analysis tools identified in metadata tags corresponding to a discoverable data set or data analysis tool. The results of the search may be the portion of all discoverable data sets that meet the minimum data quality criteria needed to deliver useful-to-optimal results with an algorithm. The results of the search may include an indication of how well the data quality criteria is met by each data set.

GUI 400 includes a number of fields including a matching section 401, a connectivity section 403, a ratings section 405, a search space section 407, a reliability section 409, a data source type section 411, a data value type section 413, a freshness section 415, and a historical volume section 417.

Using matching section 401, the user may specify whether the search criteria entered into box 420 should match contents of a metadata tag approximately or exactly. Using connectivity section 403, the user may specify whether the data set should come from live streams, online histories, or offline histories. Using ratings section 405, the user may specify minimum ratings criteria, such as minimum average rating, minimum number of ratings, specific ratings source, and ratings within a certain time period. Using search space section 407, the user may specify where the search engine will search for data sets. Using reliability section 409, the user may specify a minimum uptime or data set completeness over a time period. Using freshness section 415, the user may specify a number of new values for each parameter within a time period while ignoring empty values, default values, or deadbands. Using data source type section 411, the user may specify the type of data source collecting discoverable data sets. Using data value type section 413, the user may specify the semantic or instance type of data values, including specifying units of measurement for certain types of data values. For example, the user may search for a data set with temperature values or a data set with temperature values averaging more than 20 degrees Fahrenheit. Using historical volume section 417, the user may specify a measurement of values over a period of time. In certain embodiments, users may save, restore, and share specific search configurations with another user.

Figure 5:
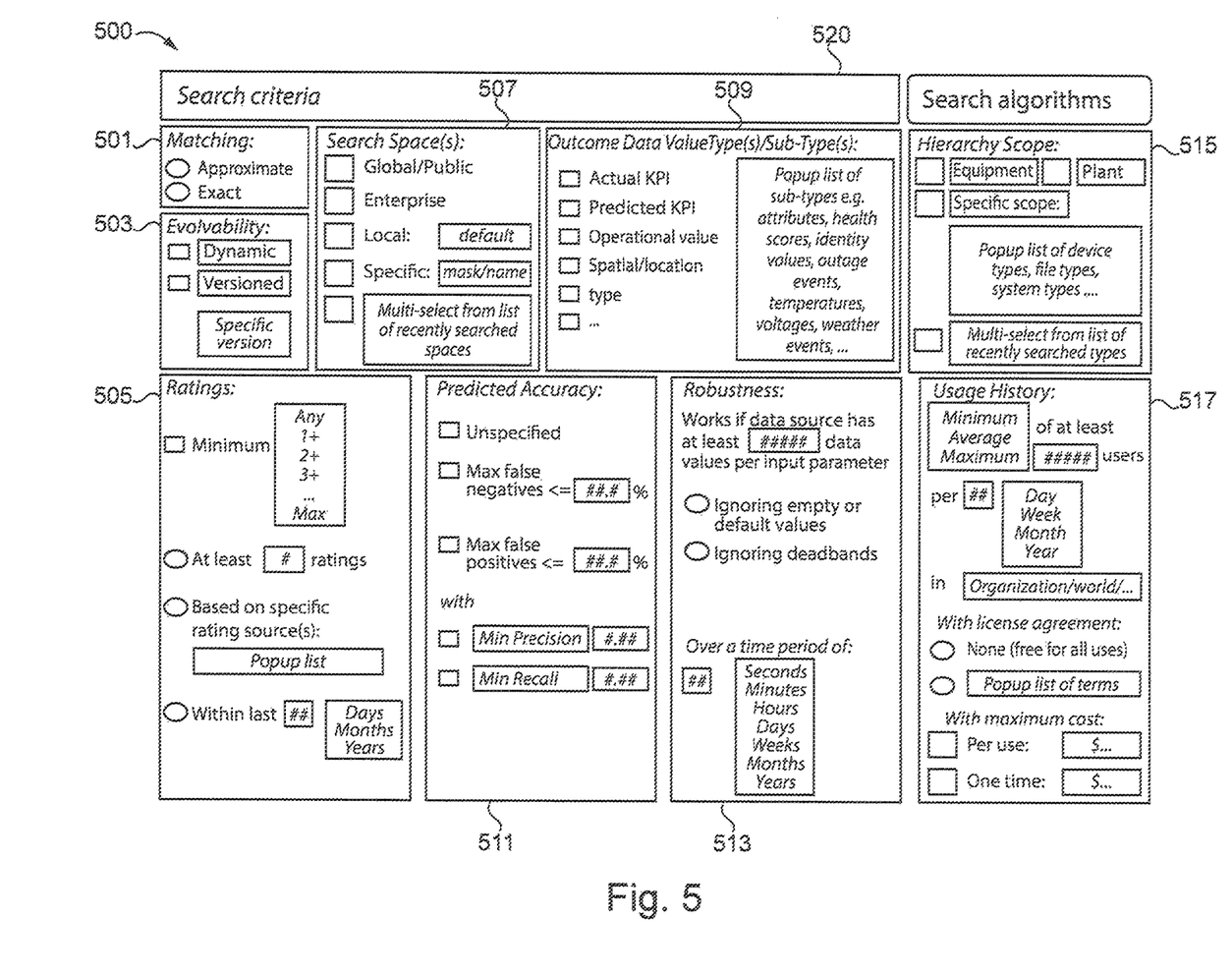
FIG. 5 illustrates an exemplary data analysis tool search engine.

With reference to FIG. 5 there is illustrated an exemplary data analysis tool search engine GUI 500 structured to display potential data analysis tool search criteria to a user. The results of the search will be the portion of all discoverable data analysis tools that meet the minimum tool quality criteria that are needed to deliver useful-to-optimal results with a data set. GUI 500 includes a matching section 501, an evolvability section 503, a ratings section 505, a search space section 507, an outcome data value type section 509, a predicted accuracy section 511, a robustness section 513, a hierarchy scope section 515, and a usage history section 517. GUI 500 also includes a search bar 520 structured to receive additional search criteria from a user not specified by other sections of GUI 500.

Using matching section 501, the user may specify whether the criteria entered into search bar 520 should match contents of a metadata tag approximately or exactly. Using evolvability section 503, the user may specify whether the data analysis tool is dynamic or has multiple versions. Using ratings section 505, the user may specify minimum ratings criteria, such as minimum average rating, minimum number of ratings, specific ratings source, and ratings within a certain time period. Using search space section 507, the user may specify where the search engine will search for data sets. Using outcome data value type section 509, the user specifies the type of data output by the data analysis tool. Using predicted accuracy section 511, the user specifies the minimum accuracy requirements of the data analysis tool. Using robustness section 513, the user specifies minimum values per time period required for the data analysis tool. Using hierarchy scope 515, the user specifies the subject of the analysis to be performed. Using historical volume section 517, the user may specify a measurement of values over a period of time. In certain embodiments, search results may include a sequence of data analysis tools.

GUI 400 or GUI 500 of FIGS. 4 and 5 may include additional search criteria. For example, either GUI may include a cost section where the user specifies whether the search results may include a data set or data analysis tool subject to a license. For results subject to a license, the user may specify acceptable license details, such as a price per use, price per time period, or price of asset, to name but a few examples. Search criteria may also include broader criteria, such as identifying an ontological type of algorithm. For example, a user may want to search for a degradation data analysis tool, a risk of failure data analysis tool, a health data analysis tool, a power production data analysis tool, or a yield data analysis tool.

In certain embodiments, a user may search for scored combinations of data sets and data analysis tools using a combined GUI structured to display selectable search criteria corresponding to data sets and data analysis tools. For example, the GUI for the combined search may be a combination of GUI 400 and 500. The purpose of the scoring is to identify the best combinations of data analysis tools and data sets available that will yield the most accurate and useful result.

To give an example of the application of an exemplary search engine, a user may need to find a tool to evaluate power transformers as part of a real-time monitoring system. The power transformer to be evaluated does have means to measure dissolved gas, but the user still wants to monitor internal faults. Therefore, the user may use the exemplary search engine to score the combinations of data sets output by the power transformer with data analysis tools able to monitor faults using the available data sets output by the transformer.

The combinations may include a single data set for use with a single data analysis tool, a plurality of data sets for use with a single data analysis tool, a single data set for use with a sequence of single data analysis tools, or a plurality of data sets for use with a sequence of data analysis tools. For example, a data analysis tool that estimates degradation of an outdoor device, such as a solar inverter, may require timestamped power production data from a monitoring system, and ambient temperature and humidity data from a cloud-based weather provider.

In order to increase the number of potential combinations to compare, an exemplary search engine may be structured to adapt a data set to match a data analysis tool's criteria or adapt a data analysis tool to match a data set's criteria. For example, the search engine may convert a data set of temperature measurements from Celsius to Fahrenheit for a data analysis tool that requires a Fahrenheit unit of measurement. In another example, a data set format could be converted to Microsoft CLR, Mathworks MWDoubleArray, or XML, to allow the data set and a data analysis tool to be a considered combination.

In certain embodiments, an exemplary search engine may evaluate combinations by performing tests to confirm search criteria of a data set or data analysis tool has been met. The performed tests generate metadata indicating if the combination will produce statistically meaningful results. For example, the search engine may sample a portion of a data set to determine if the data is normally distributed or if the data includes bias caused by measurement errors. The results of the tests are used to score the combination of the data set and data analysis tool.

Figure 6A:
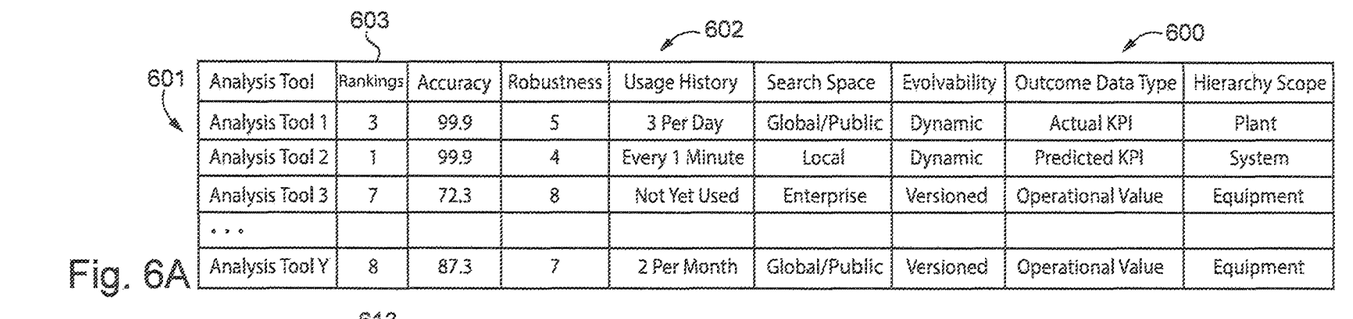
FIGS. 6A-6C illustrate outputs of search result rankings.
Figure 6B:
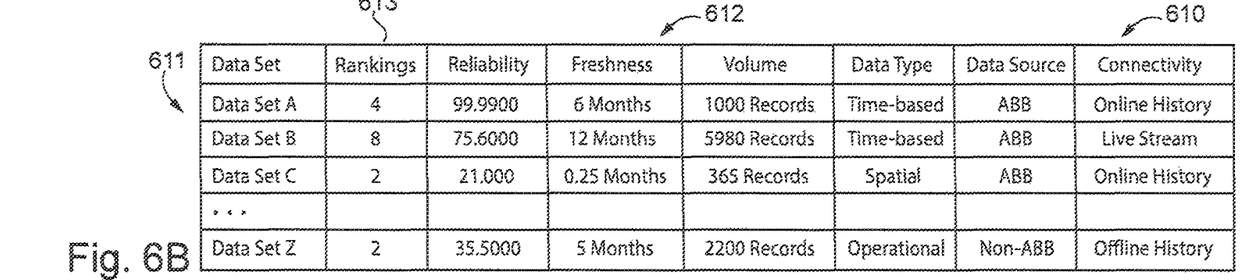
Figure 6C:
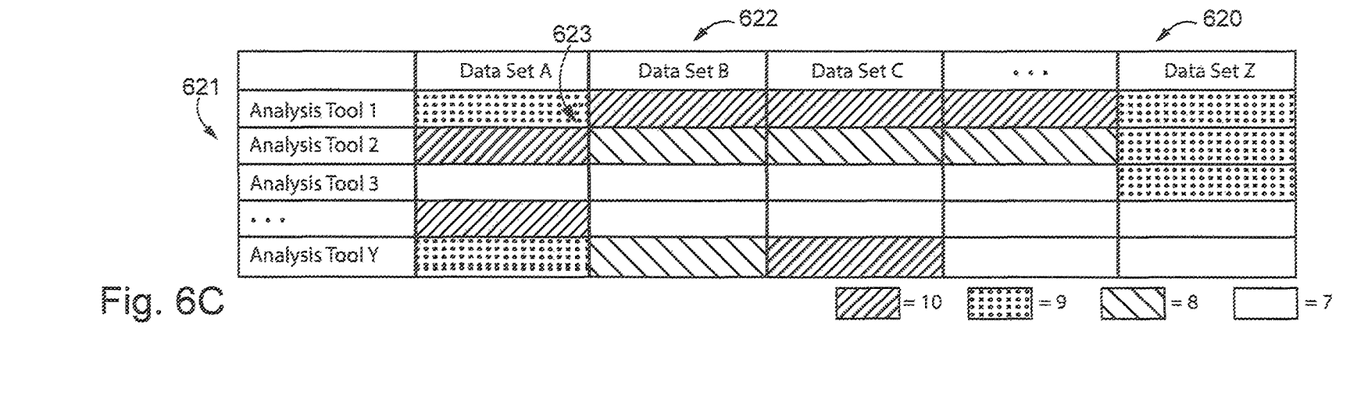

With reference to FIGS. 6A-6C, there are illustrated exemplary embodiments of search engine results. The illustrated embodiments are user-perceptible results displayable on a screen as part of a GUI. In other embodiments, search engine results include a file or other data structure transmitted to another computing device for use by another application.

With reference to FIG. 6A there is illustrated an exemplary data analysis tool search engine results table 600 including a plurality of rows 601 and a plurality of columns 602. Table 600 is displayed to a user in response to a search performed using an exemplary data analysis tool search engine, such as the data analysis tool search engine illustrated in FIG. 5. Each row of the plurality of rows 601 identifies a data analysis tool and includes sortable information related to the data analysis tool. Each column of the plurality of columns 602 includes one type of information related to data analysis tools. In the illustrated embodiment, the plurality of columns 602 includes an accuracy column, a robustness column, a usage history column, and search space column, an evolvability column, an outcome data type column, and a hierarchy scope column. The plurality of columns 602 also includes a ranking column 603 which displays a ranking for each data analysis tool calculated by the search engine using the information related to each data analysis tool. Each ranking may be unique or tiered such that a group of data analysis tools receive the same ranking. The data analysis tools are sortable by rankings column 603, and may be sortable by other columns of the plurality of columns 602.

With reference to FIG. 6B there is illustrated an exemplary data set search engine results table 610 including a plurality of rows 611 and a plurality of columns 612. Table 600 is displayed to a user in response to a search performed using an exemplary data set search engine such as the data set search engine illustrated in FIG. 4. Each row of the plurality of rows 611 identifies a data set and includes sortable information related to the data set. Each column of the plurality of columns 612 includes one type of information related to data sets. In the illustrated embodiment, the plurality of columns 612 includes a reliability column, a freshness column, a volume column, a data type column, a data source column, and a connectivity column. The plurality of columns 612 also includes a rankings column 613 which displays a ranking for each data set calculated by the search engine using the information related to each data set. Each ranking may be unique or tiered such that a group of data analysis tools receive the same ranking. The data sets are sortable by rankings column 613, and may be sortable by other columns of the plurality of columns 612.

With reference to FIG. 6C there is illustrated an exemplary combination search engine results table 610 including a plurality of rows 621 and a plurality of columns 622. Table 600 is displayed to a user in response to a combined data set and data analysis tool search. Each row corresponds to a data analysis tool and each column corresponds to a data set. The intersection of each row and column is represented by a cell of a plurality of cells 623. Each cell includes a visual indicator of a combination ranking, such as a color, texture, or numerical value. Each ranking corresponds to the strength of the results generated by executing the data analysis tool using the data set. As illustrated in FIG. 6C, the combination rankings may be tiered, where more than one cell receives the same ranking. The rankings may also be unique, where each combination receives a unique value.

Figure 7:
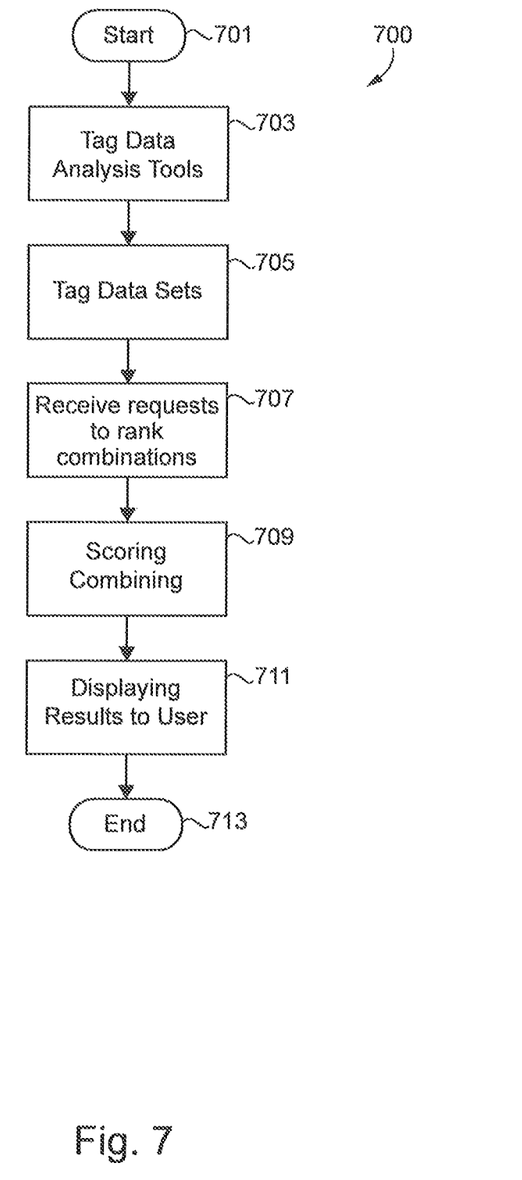
FIG. 7 is a flowchart illustrating an exemplary search result ranking process.

With reference to FIG. 7 there is illustrated a process 700 for generating a search result for a combined data set and data analysis tool search. Process 700 may be implemented in whole or in part, in one or more of the computing devices disclosed herein. In certain forms, the tagging functionalities may be performed by separate computing systems.

Process 700 begins at search operation 701 and proceeds to operation 703 where a computing device tags a plurality of data analysis tools with metadata tags. A metadata tag may indicate a data analysis tool characteristic such as an attribute of an input used by the data analysis tool or an attribute of a processing operation performed by the data analysis tool.

Process 700 proceeds to operation 705 where a computing device tags each of a plurality of data sets with at least one metadata tag. A metadata tag indicates a data set characteristic.

Process 700 proceeds to operation 707 where a computing device receives a search request to rank combinations of data sets and data analysis tools. The search request includes search criteria for the data sets and data analysis tools to be considered in the ranking. The search request may be transmitted to the computing device by a user using a user interface or another application structured to request search results from the exemplary search engine.

Process 700 proceeds to operation 709 where a computing device identifies a plurality of data sets matching search criteria included in the search request and a plurality of data analysis tools matching the search criteria included in the search request. The computing device scores each combination of a data set of the plurality of data sets and a data analysis tool of the plurality of data analysis tools by analyzing the metadata tags associated with the data sets and data analysis tools based on scoring criteria received from the user.

Process 700 proceeds to operation 711 where an input/output system displays the search results to a user or transmits the search results to another application as input data. Process 700 proceeds to end operation 713.

It shall be further appreciated that a number of variations and modifications to process 700 are contemplated including, for example, the omission of one or more aspects of process 700, the addition of further conditionals and operations, and/or the reorganization or separation of operations and conditionals into separate processes.

The processes in the present application may be implemented with programming instructions as operations by software, hardware, artificial intelligence, fuzzy logic, or any combination thereof, or at least partially performed by a user or operator. In certain embodiments, units represent software elements as a computer program encoded on a non-transitory computer readable medium performing the described operations when executing the computer program.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A computer implemented method of analyzing and ranking compatibility of combinations of a data set and a plurality of data analysis tools operable to analyze the data sets, the method comprising:
   tagging the plurality of data analysis tools with one or more metadata tags selected from a plurality of metadata tags, each of the plurality of metadata tags indicating a data analysis tool characteristic or a data set characteristic, each data analysis tool characteristic indicating at least one of an attribute of an input used by a corresponding data analysis tool and an attribute of a processing operation performed by the corresponding data analysis tool;
   tagging the data set with one or more metadata tags selected from the plurality of metadata tags, the selected metadata tags having a characteristic matching the data set characteristic of the data set;
   receiving a request to rank combinations of the data set and the plurality of data analysis tools;
   scoring a plurality of combinations of the plurality of data analysis tools and the data set according to correspondence between the metadata tags tagged to each of the plurality of data analysis tools and the metadata tags tagged to the data set; and
   outputting a ranking of the plurality of combinations indicating the scoring.

2. The method of claim 1 comprising tagging a plurality of data sets with one or more metadata tags selected from the plurality of metadata tags.

3. The method of claim 2 wherein scoring includes scoring the plurality of combinations of the plurality of data sets and the plurality of data analysis tools according to correspondence between the metadata tags tagged to each of the plurality of data analysis tools and the metadata tags tagged to each of the plurality of data sets.

4. The method of claim 1 wherein outputting the ranking includes displaying a visual indicator for each score of the plurality of potential combinations on a user-perceptible screen.

5. The method of claim 1 wherein receiving the request to rank combinations of the data set and the plurality of data analysis tools includes receiving search criteria for the plurality of data analysis tools from a user, and wherein scoring the plurality of combinations includes identifying each combination using the search criteria.

6. The method of claim 5 wherein scoring the plurality of combinations includes identifying combinations by adapting the data set for use with one of the plurality of data analysis tools.

7. The method of claim 1 wherein scoring the plurality of combinations includes testing the data set or the data analysis tool of a first combination to determine if the first combination would produce statistically significant data.

8. A computer implemented method of analyzing and ranking compatibility of combinations of a data analysis tool and a plurality of data sets analyzable by the data analysis tool, the method comprising:
   tagging the data analysis tool with one or more metadata tags selected from a plurality of metadata tags, each of the plurality of metadata tags indicating a data analysis tool characteristic or a data set characteristic, each data analysis tool characteristic indicating at least one of an attribute of an input used by a corresponding data analysis tool and an attribute of a processing operation performed by the corresponding data analysis tool;
   tagging each of the plurality of data sets with one or more metadata tags selected from the plurality of metadata tags, each of the tagged data sets having a characteristic matching the data set characteristic of the selected metadata tag with which it is tagged;
   receiving a request to rank combinations of the data analysis tool and the plurality of data sets;
   scoring a plurality of combinations of the data analysis tool and the plurality of data sets according to correspondence between the metadata tags tagged to the data analysis tool and the metadata tags tagged to each of the plurality of data sets; and
   outputting a user perceptible ranking of the plurality of combinations indicating the scoring.

9. The method of claim 8 comprising tagging a plurality of data analysis tools with one or more metadata tags selected from the plurality of metadata tags.

10. The method of claim 9 wherein scoring includes scoring the plurality of combinations of the plurality of data sets and the plurality of data analysis tools according to correspondence between the metadata tags tagged to each of the plurality of data tools and the metadata tags tagged to each of the plurality of data sets.

11. The method of claim 8 wherein outputting the ranking includes displaying a visual indicator for each score of the plurality of combinations on a user-perceptible screen.

12. The method of claim 8 wherein receiving the request to rank combinations of the data set and the plurality of data analysis tools includes receiving search criteria for the plurality of data sets from a user, and wherein scoring the plurality of combinations includes identifying each combination using the search criteria.

13. The method of claim 12 wherein scoring the plurality of combinations includes identifying combinations by adapting the data analysis tool for use with one of the plurality of data sets.

14. The method of claim 8 wherein scoring the plurality of combinations includes testing the data set or the data analysis tool of a first combination to determine if the first combination would produce statistically significant data.

15. A computing device for analyzing and ranking compatibility of combinations of a plurality of data sets and a plurality of data analysis tools, the computing device comprising:
- a processing device;
- a memory device including a stored set of instructions executable by the processing device effective to:
  - receive the plurality of data analysis tools with one or more metadata tags selected from a plurality of metadata tags, each of the plurality of metadata tags indicating a data analysis tool characteristic or a data set characteristic, each data analysis tool characteristic indicating at least one of an attribute of an input used by a corresponding data analysis tool and an attribute of a processing operation performed by the corresponding data analysis tool;
  - receive the plurality of data sets with one or more metadata tags selected from the plurality of metadata tags, each of the tagged data sets having a characteristic matching the data set characteristic of the selected metadata tag with which it is tagged;
  - receive a request to rank combinations of the data set and the plurality of data analysis tools;
  - score a plurality of combinations of the plurality of data analysis tools and the data set according to correspondence between the metadata tags tagged to each of the plurality of data analysis tools and the metadata tags tagged to the data set; and
  - output a ranking of the plurality of combinations indicating the scoring.

16. The computing device of claim 15 wherein scoring includes scoring the plurality of combinations of the plurality of data sets and the plurality of data analysis tools according to correspondence between the metadata tags tagged a sequence of the plurality of data analysis tools and the metadata tags tagged to at least one of the plurality of data sets.

17. The computing device of claim 15 wherein outputting the ranking includes displaying a visual indicator for each score of the plurality of combinations on a user-perceptible screen.

18. The computing device of claim 15 wherein receiving the request to rank combinations of the data set and the plurality of data analysis tools includes receiving search criteria for the plurality of data analysis tools from a user, and wherein scoring the plurality of combinations includes identifying each combination using the search criteria.

19. The computing device of claim 18 wherein scoring the plurality of combinations includes identifying combinations by adapting the data set for use with one of the plurality of data analysis tools.

20. The computing device of claim 15 wherein scoring the plurality of combinations includes testing the data set or the data analysis tool of a first combination to determine if the first combination would produce statistically significant data.

\* \* \* \* \*